United States Patent [19]

Story

[11] 4,023,298
[45] May 17, 1977

[54] SIGNAL DEVICE FOR FISHING

[76] Inventor: Donald E. Story, 602 Donaldson St., Canton, Mo. 63435

[22] Filed: Sept. 22, 1975

[21] Appl. No.: 615,228

[52] U.S. Cl. .................................................. 43/17
[51] Int. Cl.² ...................................... A01K 97/12
[58] Field of Search ........................................ 43/17

[56] References Cited
UNITED STATES PATENTS

| | | |
|---|---|---|
| 2,128,899 | 9/1938 | Barnhart .................................. 43/17 |
| 2,869,275 | 1/1959 | Levin ........................................ 43/17 |
| 3,882,629 | 5/1975 | Kaye ......................................... 43/17 |

Primary Examiner—Louis G. Mancene
Assistant Examiner—Daniel J. Leach
Attorney, Agent, or Firm—Gravely, Lieder & Woodruff

[57] ABSTRACT

A signal device is installed on a fish rod by means of a spring clip to indicate the presence of a fish on a line depending from the rod. When a fish moves the line, an actuating element within the device presses a flexible contactor strip against a fixed switch contact, and this completes a circuit through a bulb, thus illuminating the bulb.

9 Claims, 5 Drawing Figures

U.S. Patent      May 17, 1977      4,023,298
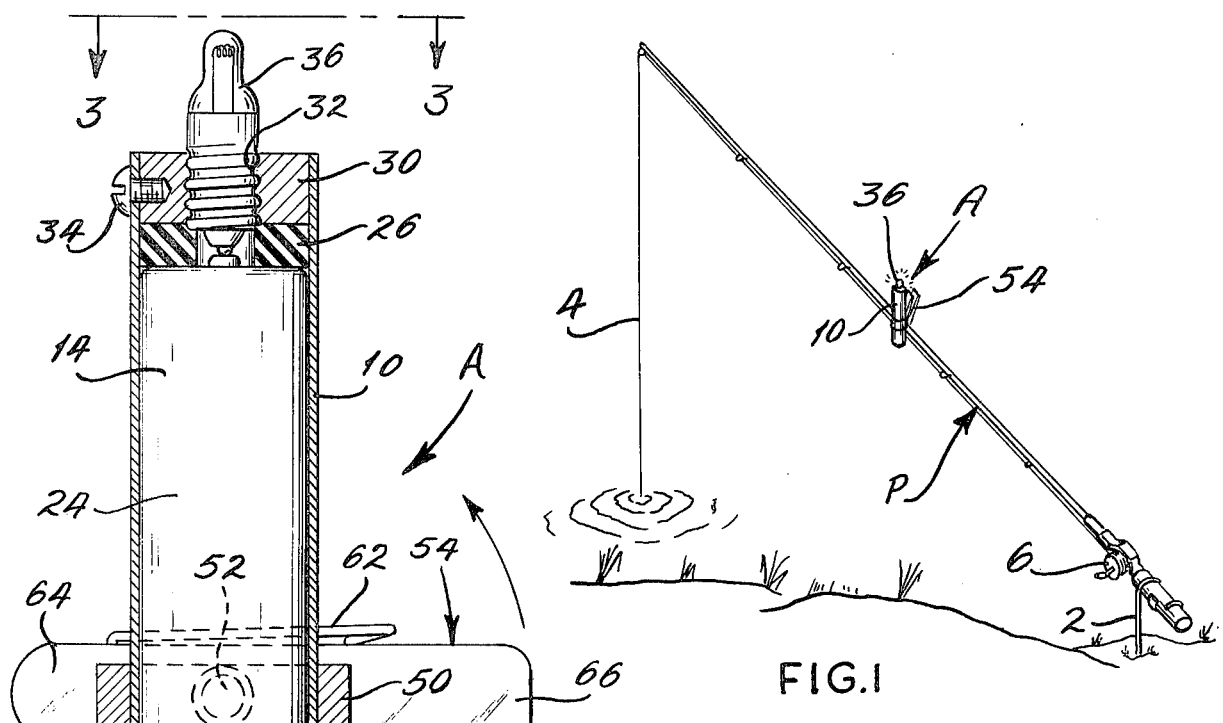
FIG.1
FIG.2
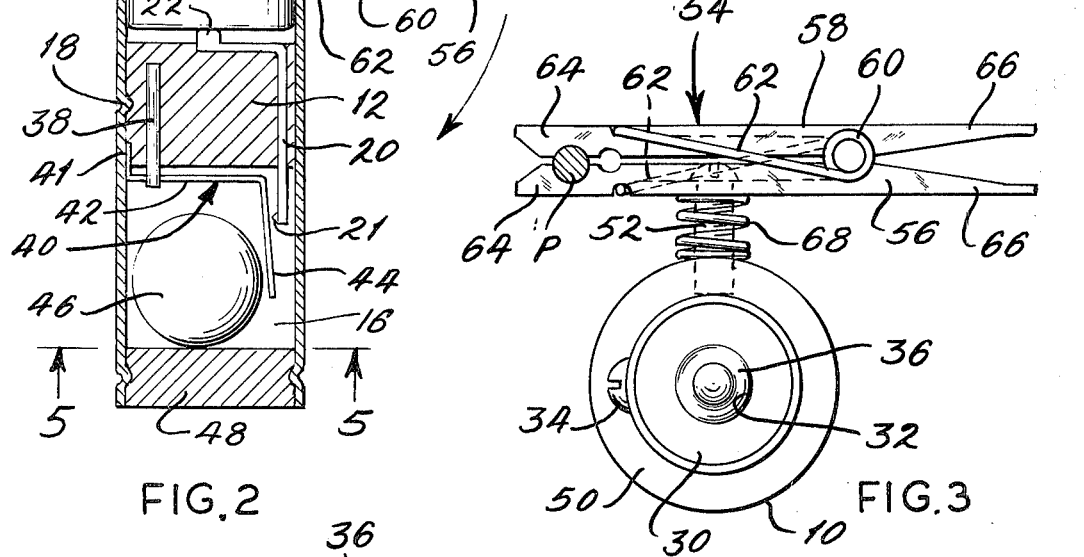
FIG.3
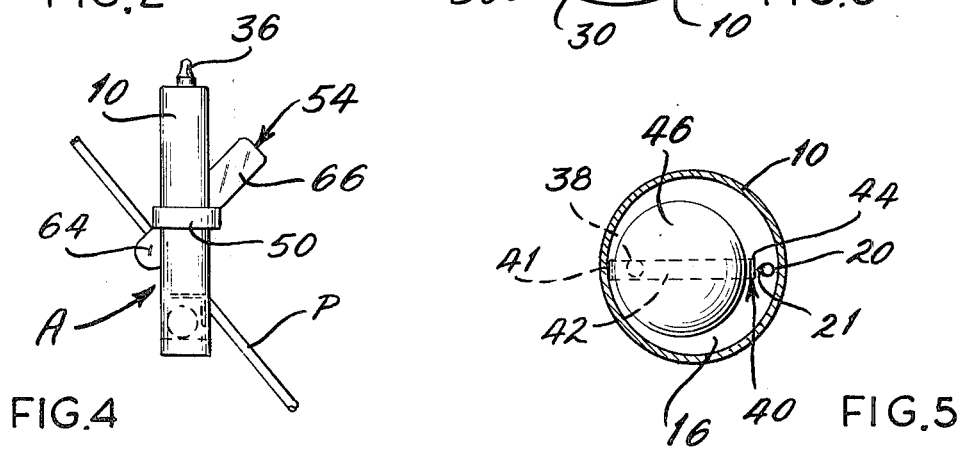
FIG.4      FIG.5

SIGNAL DEVICE FOR FISHING

BACKGROUND OF THE INVENTION

This invention relates in general to signal devices, and more particularly to a signal device for indicating the presence of a fish on a fish line.

Fishermen often set their fishing rods in special holders or rest them against stationary objects to avoid holding them for extended periods of time. This enables a single fisherman to maintain several lines in the water at the same time, since his hands are not occupied holding the rods. During daylight hours, the fisherman may detect a catch merely by observing movement of the rod or the line extended from it. Such observation is not available at night when fishing is often more productive.

SUMMARY OF THE INVENTION

One of the principal objects of the present invention is to provide a signal device which detects movement of a fishing rod and provides a signal in response to such motion to indicate the presence of a fish on the line extended from the rod. Another object is to provide a signal device of the type stated which is easily attached to and detached from a fishing rod, and furthermore may be easily adjusted to the correct position while on the rod. A further object is to provide a device of the type stated which is light in weight and highly compact so that when not in use it may be easily carried in one's pocket or in a fishing tackle box. An additional object is to provide a device of the type stated which is durable and resistant to corrosion. Yet another object is to provide a device of the type stated which may be utilized as a flashlight. These and other objects and advantages will become apparent hereinafter.

The present invention is embodied in a signal device having a case provided with a battery cavity and a switch cavity. Signal emitting means, which may be a bulb, is in the case. A contact strip is located within the switch cavity and is deflected against a switch contact which is also in the switch cavity by a weighted actuating element when the weighted element is set into motion. The contact strip together with the signal emitting means and the switch contact are in an electrical circuit with a battery located in the battery cavity, and this circuit is normally interrupted at the space between the contact strip and the switch contact. The case is mounted on the fishing rod by mounting means such that the actuating element is just away from the position in which it will deflect the contact strip against the contact. Hence, when a fish tugs on the line, the actuating element will move against the contact strip and deflect it against the switch contact so as to complete the circuit and illuminate the bulb. The invention also consists in the parts and in the arrangements and combinations of parts hereinafter described and claimed.

DESCRIPTION OF THE DRAWINGS

FIG. 1 is a perspective view of the signal device of the present invention attached to a fishing rod;

FIG. 2 is a longitudinal sectional view of the signal device taken along line 3—3 of FIG. 2;

FIG. 3 is an end view of the signal device;

FIG. 4 is a fragmentary elevational view showing the signal device properly attached to a fishing rod; and FIG. 5 is a sectional view taken along line 5—5 of FIG. 2.

DETAILED DESCRIPTION

Referring now to the drawings (FIG. 1), A designates a signal device for installation on a fishing rod P which is retained at a suitable inclination by a conventional holder 2 forced into the ground. The rod P may also be propped up against a tree, chair, bridge or any other suitable support which will hold it in an inclined or horizontal position. The rod P has a line 4 depending from its end, and the line 4 is provided with a hook and some type of bait to attract fish. The rod P further has a reel 6 around which the line 4 is wound, and to prevent the off-axis weight of the reel from turning the rod P, the rod P is normally set in its holder 2 with its reel 6 presented downwardly. When a fish becomes caught on the hook, the movement of the fish will draw the line 4 taut and cause the rod P to move. The signal device A will sense this movement and emit a flickering light which is clearly visible during periods of reduced visibility.

The signal device A includes (FIG. 2) a tubular case 10 which is preferably made from a light-weight corrosion-resistant metal such as aluminum. Intermediate its ends the case 10 is fitted with a dielectric separator block 12 which is received tightly therein and divides the interior of the case 10 into a battery cavity 14 and switch cavity 16. The block 12 is secured in place by means of several crimps 18 stamped into the case 10 to project the metal of the case 10 into the softer dielectric material of the plug 12. Extended axially through the block 12 near the metal wall of the case 10 is a conductor rod 20 which is somewhat longer than the block 12 so that its one end projects a substantial distance into the switch cavity 16. That end is provided with a small switch contact 21 which projects toward the center of the cavity 16. The opposite end of the rod 20 turns inwardly toward the center of the case 10 where it is provided with a battery contact 22 which projects axially into the battery cavity 14.

The battery cavity 14 contains a cylindrical type dry battery 24 (FIG. 2) which may be size AA. The flat or back end of the battery bears against the battery contact 22 at the base of the cavity 14, while an elastomeric seal washer 26 overlies the other end of the battery 24. The washer 26 possesses an annular configuration so that the terminal at the end of the battery 24 is not covered, but is instead exposed through the washer 26.

The case 10 at the outer end of the battery cavity 14 has a bushing 30 (FIG. 2) received therein with the fit being relatively loose so that the bushing 30 may be removed to replace the battery 24. The bushing 30 has a center aperture 32 and is maintained in place by a short retaining screw 34 which passes through the wall of the case 10 and threads into the bushing 30. The screw 34 is located on the opposite side of the case 10 from the contact 21 on the conductor rod 22 so as to indicate the location of that contact. The center aperture 32 is threaded to accommodate a conventional pen light bulb 36 which threads into it and seats against the seal washer 26. When the bulb 36 is run down to its fullest extent within the aperture 32, the center contact on it will project through the center of the seal washer 26 and will bear against the center terminal on the battery 24. The bulb 36 facilitates removal of the bushing 30 since it provides a convenient gripping surface for applying an outwardly directed axial force to the bushing 30, once the short retaining screw 34 is removed.

The dielectric block 12 has a mounting pin 38 embedded in it about 180° from the conductor rod 20, and one end of this pin projects into the switch cavity 16 where a spring metal contact element or strip 40 (FIGS. 2 and 4) is mounted on it. The contact strip 40 has a first axial segment 41, a radial segment 42, and a second axial segment 44. The first axial segment 41 is compressed between the dielectric block 12 and the metal wall of the case 10 so as to be in electrical contact with the case 10. The radial segment 42 is soldered to the end of the mounting pin 38 or is otherwise connected thereto such that a permanent and firm attachment exists between the two. The second axial segment 44 extends along and beyond the conductor rod 12, but is spaced slightly inwardly from the contact 21 thereon. About one-third of its length is between the radial segment 42 and the switch contact 21, while about two-thirds between the switch contact 21 and its free end. The contact strip 40 is quite flexible so that it may be moved against the contact 21 on the conductor rod 20 to complete a circuit between the battery 24 and bulb 36.

The switch cavity 16 further contains an actuating element in the form of a steel ball 46 (FIGS. 2 and 5), the diameter of which is greater than the radius for the interior of the case 10, but is less than the spacing between the axial segment 44 of the contact strip 40 and the portion of the interior surface of the case 10 located diametrically across the interior of the cavity 16. The diameter of the ball 46 should be about 1/16 inches to 1/8 inches smaller than the inside diameter of the case 10. A ball ⅜ inches in diameter has been found ideally suited for use in a case 10 having an inside diameter of 9/16 inches, the diameter necessary for a size AA battery.

The switch cavity 16 is closed by a bottom wall or end plug 48 (FIG. 2) which fits tightly into the end of the casing 10, but is located beyond the free end of the axial segment 44 on the contact strip 40. The spacing between the free end of the axial segment 44 and the end plug 48 is less than one-half the diameter of the steel ball 46, so that when the ball 46 rests on the plug 48 the free end of the axial segment 44 will be slightly below the center of the ball 46. The surface of the plug 48 which is presented toward the switch cavity 16 is planar and perpendicular to the axis of the case 10. The end plug 48 is preferably made from a metal, such as aluminum, which does not corrode easily.

Encircling the case 10 approximately midway between its ends is a mounting ring 50 (FIGS. 2 and 3) having a machine screw 52 threaded into it in the radial direction. The screw 52 passes entirely through the ring 50 so that when turned down to its fullest extent, its end will bear against the outer surface of the case 10 and prevent the ring 50 from moving axially along the case 10.

The signal device A is attached to the fishing rod P by means of a spring clip 54 (FIG. 3) which resembles a spring type clothes pin. The clip 54 includes a pair of clamping elements 56 and 58 and a spiral spring 60 which is interposed between the elements 56 and 58. The spring 60, in addition to the spiral portion thereof, has arms 62 coming off of the ends of the spiral portion, and these arms extend along the sides of the elements 56 and 58 and at their ends are directed over the outside surfaces of the elements 56 and 58. The spiral portion of the spring 60 is received in concave recesses in the clamping elements 56 and 58 and forms the pivot point for the two elements 56 and 58. Beyond the ends of the spring arms 62, the clamping elements 56 and 58 have jaws 64 provided with opposed concaved recesses which are about the same diameter as the midportion of the rod P. The clamping elements 56 and 58 extend in the opposite direction beyond the spring 60 to form actuating tabs 66 which, when pressed together, cause the jaws 64 to spread apart against the closing force exerted by the spring 60. The screw 52, which holds the ring 50 in place, also extends through the clamping element 56 generally midway between the concave recess of the jaw 64 thereon and the spiral portion of the spring 60. The clamping element 56 is urged against the head of the screw 52 by a coil-type compression spring 68 (FIG. 3) which encircles the shank of the screw 52 between the outer surface of the ring 50 and the element 56. The spring clip 54 is free to turn on screw 52, but the spring 68 offers some resistance to that turning motion so that the case 10 will not spin freely with respect to the clip 54.

OPERATION

To install the signal device A on the fishing rod P, the rod P should first be placed within its holder 2 or at least propped against something which will support it in an inclined position suitable for fishing (FIG. 1). Moreover, the reel 6 should be presented downwardly so that its off-axis disposition does not apply a torque to the rod P. Thereupon the bulb 36 is screwed down to bring its center contact against the center terminal on the battery 24 which is exposed through the seal washer 26. The bulb 36 may or may not burn, depending on the location of the ball 46 in the switch cavity 16. The signal device A is then transferred to and installed on the rod P near the midpoint thereof. Thereafter, the case 10 is adjusted to a vertical disposition (FIG. 4) in which the bulb 36 is off, but will flicker with slight movement of the rod P.

More specifically, the actuating tabs 66 of the spring clip 54 are squeezed together against the force of the spiral spring 60, and this spreads the jaws 64 apart sufficiently to enable the rod P to be received between them. With the jaws 64 spread, the clip 54 is placed over the rod P such that the tabs 64 either project directly toward or directly away from the water (FIG. 1). This places the axis of the screw 52 in a horizontal disposition. When the clip 54 is so positioned, the tabs 66 are released and the jaws 64 are permitted to grip the rod P at their concave recesses. Next, the case 10 is rotated about the axis of the screw 52 to a vertical position with its bulb 36 presented upwardly (FIG. 4). In this regard, when the axes of the screw 52 is horizontal, the case 10 is located to the side of the rod P and can be rotated to a vertical disposition without interfering with the rod P. The ball 46 will rest on the flat surface of the end plug 48. Thereupon, the case 10 is moved still further in the direction which causes the ball 46 to roll toward the axial segment 44 of the contact strip 40. The ball 46 will deflect the axial portion 44 against the switch contact 21 on the conductor rod 20, and this will complete a circuit through the bulb 36 and battery 24 so as to illuminate the bulb 36. The circuit traces as follows: from the center terminal of the battery 24 through the filament of the bulb 36 to the base of the bulb 36; thence to the bushing 30 and case 10 as well as the contactor strip 40 which is always against the case 10; finally through the switch contact 21 and conductor rod 20 to the base or other end of the battery 24. The ball 46, although formed from an electrically conductive material, does not form part of the circuit. Once the bulb 36 is illuminated, the case 10 is rotated in the opposite direction to the position in which the bulb first extinguishes, that is the position in which the ball 46 is barely incapable of exerting enough force on the axial segment 44 of the contact strip 40 to deflect it against the switch contact 21. Now when slight motion is imparted to the signal device A, the ball 46 will move slightly within the switch cavity 16 and its inertia will deflect the axial segment 44 of the contact strip 40 against the contactor 21, the end result being that the bulb 36 will flicker. In this regard, it should be noted that the axial segment 44 functions similar to a lever with the pivot or fulcrum being far removed from the location at which the ball 46 bears against the axial segment 44. Hence, it takes very little force to deflect the axial segment 44 against the switch contact 21.

Should a fish cause the line 4 to move, the entire rod P will move and the bulb 36 will flicker, thus signalling the presence of a fish on the line 4. The fisherman is of course alerted and lifts the rod P off of its support to reel in the fish. The signal device A is easily removed at this time, merely by pressing the tabs 66 of the spring clip 54 together.

When removed from the fishing pole P, the signal device A may be utilized as a flashlight.

To prevent the bulb 36 from burning when the signal device A is not in use, the bulb 36 should be unscrewed slightly so that its center contact breaks contact with the terminal in the center of the battery 24. When so loosened, the seal washer 26 still bears against the base of the bulb 36 and keeps it from working out of the aperture 32. The washer 26 further forms a seal to prevent moisture from entering the case 10.

The spring clip 54 is capable of accommodating a wider variety of rods if its jaws 64 are provided with two sets of concave recesses with the one set being smaller in diameter than the other (FIG. 3).

This invention is intended to cover all changes and modifications of the example of the invention herein chosen for purposes of the disclosure which do not constitute departures from the spirit and scope of the invention.

What is claimed is:

1. In combination with a fishing pole held in a fixed position and having a fish line depending from it, an improved device for signalling the presence of a fish on the fish line, said device comprising: an elongated case formed from metal and having a hollow interior of cylindrical configuration; a dielectric separator block in the case intermediate its ends and dividing the interior of the case into a battery cavity and a switch cavity, the switch cavity having a bottom wall which extends across the case; a conductor extending through the separator block and having a battery contact located within the battery cavity and a switch contact located in the switch cavity; a battery in the battery cavity and having its one end in contact with the battery contact; an end element on the case at the end of the battery cavity, the end element being removable to expose the interior of the battery cavity so that the battery may be installed in and removed from the battery cavity; a bulb installed in the end element and contacting the other end of the battery at a center thereof, the bulb having a base which is in electrical contact with the case through the end element; a metal contact strip mounted on the dielectric separator block and extending generally axially through the switch cavity; the contact strip being normally spaced from the switch contact but being flexible so that it can be deflected against the switch contact to complete an electrical circuit through the bulb to illuminate the bulb; an actuating element of circular configuration loosely contained within the switch cavity and being of sufficient weight to deflect the contact strip against the switch contact; and a spring clip attached to the case and having jaws which grip the fishing rod to secure the signal device on the fishing rod, the attachment being such that the case is to the side of the clip and may be rotated relative to the clip about an axis extended crosswise to the pole and to the longitudinal axis of the case so that the bottom wall of the switch cavity can be brought to a position wherein the actuating element is barely incapable of pressing the contact strip against the switch contact, whereby when a fish tugs on the line, the rod and case will move, imparting motion to the actuating element within the switch cavity, so that the actuating element will press the contact strip against the switch contact and the bulb will illuminate to indicate the presence of the fish on the line.

2. A signal device for indicating the presence of a fish on a fish line depending from a fishing rod, said device comprising: a case having a battery cavity and a switch cavity therein, the battery cavity being sized to receive a battery and the switch cavity having a bottom wall; a spring loaded clip capable of gripping the fishing pole and being connected to the battery case to the side of the case such that the battery case may be rotated relative to the clip about an axis which is crosswise with respect to the longitudinal axis of the pole, the orientation of the axis and the location of the clip with respect to the case being such that when the clip is engaged with the pole the case may be rotated about the axis to an operating position in which the case is to the side of the pole and the bottom wall is located downwardly with respect to the switch cavity and also generally horizontally; an electrical contact located in a generally fixed position within the switch cavity, a flexible contact strip located within the switch cavity and normally spaced from the contact; electrically operated signal emitting means on the case for providing a signal when energized, the signal means being in an electrical circuit with the battery, the contact, and the contact strip, with the circuit normally being broken at the space between the contact and the contact strip, the circuit being such that when the contact strip touches the contact, the signal emitting means is placed across the battery and energized; and a circular actuating element in the cavity and resting on the bottom wall to the side of the contact strip when the battery case is in the operating position, the actuating element being of sufficient size and weight to bear against and move the contact strip against the contact when the case is moved so as to complete the circuit and energize the signal emitting means.

3. A device according to claim 2 wherein the bottom wall of the switch cavity is flat and the actuating element is spherical and rolls on the bottom wall of the switch cavity.

4. A device according to claim 2 wherein the contact strip contacts the electrical contact intermediate its ends and has a free end, the actuating element being positioned to engage the contact strip near its free end.

5. A device according to claim 2 wherein the signal emitting means is a light bulb mounted on the case.

6. A device according to claim 5 and further comprising a bushing fitted into the case at the end of the battery cavity and retaining the light bulb, the bushing being removable from the case to expose the battery cavity so that a battery may be inserted therein or removed therefrom.

7. A device according to claim 2 wherein the case is cylindrical; and wherein a dielectric separator member is contained within the case and separates the battery cavity from the switch cavity.

8. A device according to claim 7 wherein an electrical conductor extends through the dielectric separating member and has its one end projected into the battery cavity for contacting a battery therein, the other end of the conductor projecting into the switch cavity and carrying the electrical contact.

9. A device according to claim 8 wherein the conductor extends axially through the dielectric separator member, and the contact strip has a radial segment which is electrically connected with the case and an axial segment which extends from the radial segment past electrical contact.

* * * * *